United States Patent [19]

Miyanohara et al.

[11] 4,118,319

[45] Oct. 3, 1978

[54] TREATMENT OF SLUDGE

[75] Inventors: Isao Miyanohara; Hiroshi Miyazaki; Hideo Kawamura, all of Shin-nanyo, Japan

[73] Assignee: Toyo Soda Manufacturing Co., Ltd., Japan

[21] Appl. No.: 774,051

[22] Filed: Mar. 3, 1977

[30] Foreign Application Priority Data

Mar. 11, 1976 [JP] Japan ............................ 51-25526
Apr. 14, 1976 [JP] Japan ............................ 51-41201
May 18, 1976 [JP] Japan ............................ 51-56114

[51] Int. Cl.² ............................ C02B 1/20; C02C 3/00
[52] U.S. Cl. ............................ 210/51; 210/52; 210/67
[58] Field of Search ............ 210/10, 45, 47, 65-67, 210/51-53

[56] References Cited

U.S. PATENT DOCUMENTS 3,377,271  4/1968  Cann ............................ 210/10
3,720,608  3/1973  Stauffer ........................ 210/10

FOREIGN PATENT DOCUMENTS 1,361,042  7/1974  United Kingdom ............ 210/10
1,318,861  5/1973  United Kingdom ............ 210/67

Primary Examiner—Thomas G. Wyse
Attorney, Agent, or Firm—Oblon, Fisher, Spivak, McClelland & Maier

[57] ABSTRACT

Light burned magnesia is added to sludge which comprises biological aggregate or polyvalent metal hydroxide aggregate to improve filtering characteristics.

9 Claims, No Drawings

TREATMENT OF SLUDGE

BACKGROUND OF THE INVENTION

1. Field of the Invention

The present invention relates to an improved treatment of sludge which comprises biological aggregate or polyvalent metal hydroxide aggregate to improve filtering characteristics.

2. Disclosure of the Prior Art

Various drainage treatments have been required for preventing pollution of environments.

The microorganism treatment has become important to treat the drainages such as drainage containing organic material. The microorganism treatment has been widely applied for various treatment of industrial waste and for removement of nitrogen sources which cause nutritious water in lakes or red sea water.

The microorganism treatment has been considered to be remarkably advantageous and has been widely applied, however serious problem has been caused. The problem is the treatment of the proliferated microorganism. In the drainage treatment, the sludge caused by the proliferated microorganism treatment is called as excess sludge to be discharged out of the system.

The discharged sludge containing the microorganism is pasty and tacky material which has high water content and is dehydrated and burnt or used in the reclamation or for other purposes.

However, it has been difficult to dehydrate the sludge by a filtration etc. because of tackiness. Accordingly, the treatment has been unsatisfactory and the treated sludge contains relatively high water content and serious disadvantage has been found for the further treatment.

Various treatments have been proposed to improve the dehydration of the sludge by an addition of lime, ferric chloride, polyaluminum chloride, polymer coagulants etc. before the filtration.

However, the effects are not satisfactory and impart slight decrease of the load of the filter etc. or cause other troubles. The problem has not been satisfactorily dissolved.

On the other hand, the aggregration-neutralization method imparts remarkable effect for removing suspensions metal compounds, COD, BOD, etc. by a simple equipment and operation and accordingly, it has been widely applied for the water purification, drainage treatment or industrial drainage treatment, etc.

However, serious problem has been closed up on the aggregation-neutralization method. The problem is the treatment of the sludge in the aggregation-neutralization method.

Typical coagulants include aluminum type coagulants such as aluminum sulfate, polyaluminum chloride, sodium aluminate; and iron type coagulants such as ferric chloride, ferrous sulfate, etc. These metal compounds as the coagulant are precipitated as the metal hydroxide and are separated as the sludge. The industrial drainages contain various metal compounds such as compounds of Fe, Cu, Al, Sn, Zn, Ni, Cr, Ti, etc. In order to remove these metal compounds, the neutralization-precipitation method has been usually employed, and these compounds have been removed as the metal hydroxide precipitates in the form of sludge. Thus, the sludges are hydrated pasty materials in the form of aquocomplexes, etc. whereby the dehydration are not easily attained. Accordingly, it has been difficult to use the sludge in effective usage and to use the sludge in the reclamation.

In order to improve the disadvantages, the sludges have been treated to improve the dehydration properties as follows:

(1) to add lime or ferric chloride;
(2) to filtrate it after heating under high pressure;
(3) to filtrate it after dissolving the metal hydroxide with acid;
(4) to filtrate it after adding a polymer coagulant;
(5) to separate water by a special filter cloth; or
(6) to filtrate it after freezing the hydrate and melting it.

These methods have certain disadvantages and have not been satisfactory on the cost and the post treatments.

SUMMARY OF THE INVENTION

It is an object of the present invention to provide an improved treatment of sludge which comprises biological aggregate or polyvalent metal hydroxide aggregate to improve filtering characteristics.

The object of the present invention has been attained by adding light burned magnesia to the sludge which comprises biological aggregate or polyvalent metal hydroxide aggregate to improve filtering characteristics.

DETAILED DESCRIPTION OF THE PREFERRED EMBODIMENTS

The mechanism of characteristic change of the sludge containing biological aggregate or polyvalent metal hydroxide aggregate has not been clear. However, the pasty sludge is changed to nontacky flocculent precipitate and is discolored.

It has been considered that the mechanism is different from those of the other coagulants.

The sludges containing biological aggregate are sludge containing biological organic materials as main components which are the active sludge, nitration sludge, denitrogen sludge, digestive sludge which are used for drainage treatments and sludges containing natural algae vomit sludge, microorganism sludge used for synthesis in fermentation. The drainage includes waste water and swage.

The sludges used in certain processes can be also treated so as to impart improved processes.

The sludges containing polyvalent metal hydroxides are formed by various industrial processes especially using polyvalent metal compounds. When inorganic coagulants such as aluminum type coagulants and iron type coagulants are added to drainages etc., the polyvalent metal hydroxides are formed. In industries using aluminum such as aluminum surface treatment, and manufacture of electric parts, the drainages are usually treated by the neutralization-sedimentation method whereby aluminum hydroxide is formed and is separated as the sludge.

In the other industries using metals or polyvalent metal compounds, the polyvalent metal hydroxides can be precipitated as the sludge for separating the polyvalent metal compounds from the drainages.

The light burned magnesia has high chemical activity and can be obtained by calcining magnesium hydroxide or other magnesium compounds at lower than 1000° C. More particularly, magnesium hydroxide or carbonate is calcined at 800° to 900° C.

The light burned magnesia can be added to the sludge in a form of slurry or powder, preferably in a form of powder.

The sludge is in a form of suspension or a form of mud containing water and usually contains solid components in a range of 500 to 50,000 ppm. The light burned magnesia can be added to the sludge in any solid content.

The amount of the light burned magnesia added to the sludge is dependent upon types of concentrations of the sludge and the degree of characteristic modification and is not critical and is usually in a range of 1 to 1,000% preferably 3 to 200% to the solid components in the sludge.

The light burned magnesia can be added and blended in a continuous system or a batch system. It is not necessary to vigorously stir as far as the light burned magnesia contacts enough to the solid components of the sludge. Accordingly, the conventional method of addition and blending can be used.

When the light burned magnesia is added to the sludge containing polyvalent metal hydroxide, it is preferable to give pH of higher than 9. The sludge treated with the light burned magnesia (hereinafter referring to as modified sludge) can be also used as the source of light burned magnesia. When the modified sludge is used, it is also preferable to give pH of higher than 9.

When the treatment of the invention is compared with the treatment by adding lime, the results are substantially different and the filtration characteristic in the treatment of the invention is 5 to 10 times higher than that of the treatment by using lime.

In the treatment by adding lime to the treated sludge, pH is high as about 12 whereby various troubles are caused in the post-treatment of the sludge, disadvantageously. If the treated sludge is neutralized for preventing the trouble, the effect for adding lime disappear. The treated sludge is modified in non-pasty condition only in the condition of high pH.

On the contrary, in the treatment of the invention, the form of the sludge is completely modified by adding the light burned magnesia to give pH of higher than 9 whereby the filtration characteristics are substantially improved. The pH of the sludge is preferably in a range of 9 to 12. The modified sludge is stable and the pH of the modified sludge can be adjusted to the range of non-soluble of the metal hydroxide such as pH of 5 to 9. The improved filtration characteristics is not adversely affected. This phenomenon is different from the conventional treatments. The mechanism of the modification of the sludge containing the polyvalent metal hydroxide by the addition of the light burned magnesia is not clear but it is considered to cause disconnection of bonds of hydrated molecules by certain chemical reaction.

The light burned magnesia is preferably added to the sludge which is separated after aggregation and neutralization in a clarifier or to the sludge concentrated by sedimentation in a thickner.

In some case, the sludge is admixed with a mineral acid to give acidic pH or to dissolve a part of the polyvalent metal hydroxide and then the light burned magnesia is added to give pH of higher than 9 so as to improve or fasten the modification of the sludge.

The amount of the light burned magnesia is usually more than 1 wt. % to the solid components in the sludge and is preferably more than 3 wt. % to the metal hydroxide in the sludge and is preferably less than 1,000 wt. % (10 times) to the metal hydroxide from the economical viewpoint.

The modified sludge can be used instead of the light burned magnesia to impart the same effect.

A part of the modified sludge is recycled to add it to the untreated sludge to give pH of higher than 9. The modified sludge can be the sludge before the filtration or the cake after the filtration. The amount of the modified sludge recycled is usually in a range of 5 to 50 wt. %. The effect may be improved by adding the light burned magnesia or the other base to the sludge.

It is possible to add another magnesium compound such as magnesium hydroxide, magnesium chloride, magnesium sulfate, magnesium carbonate, basic magnesium carbonate, etc., together with the light burned magnesia to the sludge to give pH of higher than 9. The pH of the sludge can be increased to be higher than 9 if necessary with a base such as sodium hydroxide, sodium carbonate, lime, ammonia, etc. The amount of the magnesium compound is preferably in a range of about 0.1 to 100 wt. % especially 0.2 to 50 wt. % as Mg to the solid components in the sludge containing biological aggregate.

It is preferable to add an iron salt such as ferric chloride, ferrous chloride, ferric sulfate, ferrous sulfate, etc. together with the magnesium compound to the sludge. This is one of the important features. The pH of the sludge can be increased to be higher than 9 if necessary with a base. Total amounts of the magnesium compound and the iron salt is preferably in a range of about 0.1 to 100 wt. % especially 0.2 to 50 wt. % as Mg + Fe to the solid components in the sludge.

The invention will be further illustrated by certain examples.

EXAMPLE 1

Active sludge sampled from an active sludge storage for a drainage from an acetic acid plant, (solid concentration of 2000 ppm) was charged for each 300 cc in six beakers.

The additives in the solid form shown in Table 1 were respectively added at a ratio of 3000 ppm (calculated as anhydrate for hydrated salts) and each mixture was stirred for 5 hours, and was sampled to use it, in a filtering test.

In the filtering test, 100 cc of each sample was filtered through a glass filter (G-4) (diameter of about 4 cm) which was precoated with 0.2 g of diatomaceous earth under a reduced pressure (degree of vacuum of 760 mmHg). The filtration characteristic was shown by the time needed for filtering 100 cc of the sample. The results are shown in Table 1.

Table 1

| | Additive | Filtering time |
|---|---|---|
| Invention | light burned magnesia | 7 min. |
| Reference | $Mg(OH)_2$ | 110 min. |
| | $MgCl_2$ | 60 min. |
| | $MgSO_4$ | 70 min. |
| | $Ca(OH)_2$ | 50 min. |
| | none | 180 min. |

The active sludge (solid concentration of 2000 ppm) was concentrated to the solid concentration of 4000 ppm by sedimentation and then, it was charged for each 200 cc into three beakers.

The additives in the solid form shown in Table 2 were respectively added at a ratio of 3000 ppm and each mixture was stirred for 1 hour and was maintained for one night and was sampled to use it in a filtering test.

Table 2

| | Additive | Filtering time |
|---|---|---|
| Our invention | light burned magnesia | 17 min. |
| Reference | CaO | 120 min. |
| | none | more than 180 min. |

EXAMPLE 2

Active sludge sampled from a sewage treating plant (solid concentration of about 4000 ppm) was charged for each 200 cc in four beakers.

The additives in the solid form shown in Table 3 were respectively added at a ratio of 4000 ppm and each mixture was stirred for 1 hour and was maintained for one night and was sampled to use it in the filtering test of Example 1. The results are as follows:

Table 3

| | Additive | Filtering time |
|---|---|---|
| Our invention | light burned magnesia | 8 min. |
| Reference | $Mg(OH)_2$ | 120 min. |
| | $Ca(OH)_2$ | 60 min. |
| | none | more than 180 min. |

EXAMPLE 3

Nitrated sludge (solid concentration of about 4000 ppm) sampled from a nitration pilot plant in the third treatment wherein ammonia nitrogen in the drainage of the second treatment is converted with a microorganism to nitric acid or nitrous acid, was charged for each 200 cc in six beakers.

The additives in the solid form shown in Table 4 were respectively added at a ratio of 2000 ppm and each mixture was stirred for 1 hour and was sampled to use in the filtering test of Example 1. The results are shown in Table 4.

Table 4

| | Additive | Filtering time |
|---|---|---|
| Our invention | light burned magnesia | 7 min. |
| Reference | $Mg(OH)_2$ | 160 min. |
| | $MgCl_2$ | 140 min. |
| | $MgSO_4$ | 150 min. |
| | $Ca(OH)_2$ | 120 min. |
| | none | more than 180 min. |

The sludge (solid concentration of about 4000 ppm) was concentrated to the solid concentration of about 7000 ppm by sedimentation and then, it was charged for each 200 cc into three beakers.

The additives in the solid form shown in Table 5 were added at a ratio of 3000 ppm and each mixture was stirred for 5 hours and was sampled to use it in the filtering test of Example 1. The results are shown in Table 5.

Test 5

| | Additive | Filtering time |
|---|---|---|
| Our invention | light burned magnesia | 12 min. |
| Reference | CaO | 120 min. |
| | none | more than |

Test 5-continued

| Additive | Filtering time |
|---|---|
| | 180 min. |

EXAMPLE 4

Denitrated sludge (solid concentration of about 10,000 ppm including aluminum hydroxide solid at a ratio of 800 ppm as Al caused by the addition of aluminum sulfate) sample from a denitration pilot plant in the third treatment wherein ammonia nitrogen in the drainage of the second treatment is converted to nitric acid or nitrous acid and then is converted with microorganism to nitrogen gas, was charged for each 200 cc in four beakers.

The additives in the solid form shown in Table 6 were respectively added at a ratio of 2000 ppm and each mixture was stirred for 1 hour and was sampled to use in the filtering test of Example 1. The results are shown in Table 6.

Table 6

| | Additive | Filtering time |
|---|---|---|
| Our invention | light burned magnesia | 8 min. |
| Reference | $Ca(OH)_2$ | 110 min. |
| | CaO | 100 min. |
| | none | more than 180 min. |

EXAMPLE 5

Polyaluminum chloride coagulant was added, at a ratio of 5 ppm as $Al_2O_3$ to 50 liters of river water having about 50 of kaoline turbidity and the mixture was stirred for 5 min. with vigorously stirring and for 20 min. with slowly stirring, and was maintained for about 1 hour to precipitate aggregate. The supernatant liquid was removed to store the precipitate. The operation was repeated for several times and the resulting precipitate was combined and was maintained for 16 hours and the concentrated sludge was separated. The sludge contained about 1 wt. % of solid components and about 0.15 wt. % of aluminum hydroxide derived from the coagulant.

The sludge was charged for each 500 g in four beakers, and the additives were respectively added to each sludge and each mixture was stirred for 1 hour and was maintained for one night.

A filtering speed was measured by a leaf tester (Miyamoto Seisaku-sho) with a filter cloth (polypropylene 26-S) precoated with diatomaceous earth. The pH of the treated sludges and the filtering speeds are shown in Table 7.

EXAMPLE 6

In accordance with the process of Example 5 except using ferric chloride at a ratio of 30 ppm as $FeCl_3$ instead of polyaluminum chloride coagulant, the sludge (solid concentration of about 1 wt. % including about 0.4 wt. % of ferric chloride) was prepared and was charged for 500 g in four beakers and the additives were respectively added to each sludge and each mixture was stirred for 1 hour and was maintained for one night and the filtering speed was measured. The pH of the treated sludges and the filtering speeds are shown in Table 7.

Table 7

|  | Additive | Example 5 Amount (g) | Example 5 pH of sludge | Example 5 Filtering speed (kg/m²hr) | Example 6 pH of sludge | Example 6 Filtering speed (kg/m²hr) |
|---|---|---|---|---|---|---|
| Our invention | light burned magnesia | 0.7 | 9.2 | 40 | 10.6 | 5 |
| Reference | " | 0.1 | 7.9 | 6 | 8.2 | 1 |
|  | CaO | 0.7 | 10.5 | 4 | 11.0 | 1 |
|  | none | 0 | 6.4 | 2 | 6.0 | 1 |

EXAMPLE 7

An aqueous aluminum sulfate (0.2 wt. % as $Al_2O_3$) was neutralized with 1N-NaOH to be pH 7 to obtain a suspension containing about 0.3 wt. % of aluminum hydroxide.

500 cc of the suspension and 500 cc of the sludge prepared by concentrated by sedimentation for one night at a ratio of 5 times of concentration, were respectively charged in seven beakers. The additives were added as shown in Table 8. One was remained for the test for recycling the sludge.

The filtering test of Example 5 was carried out for six samples by stirring for 3 hours.

The pH of the treated sludges and the filtering speeds are shown in Table 8.

Table 8

|  |  | Additive | Amount (g) | pH of sludge | Filtering speed (kg/m².hr) |
|---|---|---|---|---|---|
| Suspension | Our invention | light burned magnesia | 0.5 | 9.1 | 7 |
|  | Reference | " | 0.1 | 7.9 | 1.5 |
|  |  | none | 0 | 6.9 | 1 |
| Concentrated sludge | Our invention | light burned magnesia | 7 | 9.6 | 7 |
|  | Reference | " | 2 | 8.2 | 1 |
|  |  | none | 0 | 7.0 | 0.3 |

A part of the cake (solid components of 2 g) (light burned magnesia was added) was recycled to add to the concentrated sludge and about 2 g of the light burned magnesia was further added, and the mixture was stirred for 3 hours. The filtering test was carried out in accordance with the method of Example 5. The pH of the sludge was 10.2 and the filtering speed was 13 kg/m² · hr.

EXAMPLE 8

An aqueous solution of $Fe_2(SO_4)_3$ (0.5 wt. %) was neutralized with 1N-NaOH to be pH of 7 to obtain a suspension containing about 0.2 wt. % of ferric hydroxide. The suspension was charged for each 500 cc in four beakers. The additives were added as shown in Table 9 and the mixtures were stirred for 5 hours. (One sample was remained for the recycling test). The filtering tests were carried out in accordance with the method of Example 5. The pH and the filtering speed were shown in Table 9.

Table 9

|  | Additive | Amount (g) | pH of sludge | Filtering speed (kg/m². hr.) |
|---|---|---|---|---|
| Our invention | light burned magnesia | 1 | 9.3 | 7 |
| Reference | " | 0.2 | 8.2 | 1.3 |
|  | none | 0 | 7.0 | 0.8 |

A part of the cake (solid components of 0.5 g) (light burned magnesia was added) was recycled to add to the suspension and the mixture was stirred for 5 hours and the filtering test was carried out in accordance with the method of Example 5. The pH of the sludge was 10.1 and the filtering speed was 10 kg/m² · hr.

EXAMPLE 9

Active sludge from an active sludge storage for a waste water from an acetic acid plant was concentrated to form a concentrated sludge (solid concentration of about 1.5%).

The concentrated sludge was charged for each 300 cc in beakers. The light burned magnesia (powder) and ferric chloride (38% aqueous solution) were added to the concentrated sludge at ratios shown in Table 10.

The mixtures were respectively stirred by a jar tester for 20 minutes to obtain the treated sludges. The filtering test of Example 1 was carried out. The results are shown in Table 10. In Table 10, the addition of base means to gradually add 10% milk of lime after the addition of ferric chloride to give the pH.

Table 10

|  | Amounts to solid components light burned magnesia | lime | ferric chloride | Addition of base (pH) | Filtering time (min.) |
|---|---|---|---|---|---|
| Invention | 7 |  | 7 | 10.5 | 2 |
|  | 3 |  | 3 | 11 | 4 |
|  | 1 |  | 1 | 9.5 | 12 |
|  | 7 |  |  | 10.5 | 27 |
|  | 7 |  | 7 | 8.5 | 12 |
|  | 3 |  | 3 | 8 | 18 |
|  | 1 |  | 1 | 8 | 31 |
|  | 7 |  |  | 8.5 | 45 |
| Reference |  | 30 | 7 | 13 | 55 |
|  |  | 15 | 7 | " | 55 |
|  |  | 7 | 7 | " | 80 |
|  |  | 15 | 3 | " | >180 |
|  |  | 7 | 3 | " | >180 |

EXAMPLE 10

Active sludge (solid concentration of about 1%) sampled from a sewage treating plant, was charged for each 200 cc in beakers. A 10% slurry of light burned magnesia (as MgO) was added to each active sludge and 38% aqueous solution of ferric chloride (as $FeCl_3$) was added to each mixture at 30 minutes after the addition at the ratios shown in Table 11. As the reference, only 10% slurry of light burned magnesia was added without adding ferric chloride.

Each mixture was slowly stirred in jar-tester for 20 minutes to obtain each treated sludge and the filtering test was carried out in accordance with the method of Example 1 for each sample.

In order to compare it, the sludge was treated by adding ferric chloride and powdery lime ($Ca(OH)_2$) to the concentrated sludge at the ratios shown in Table 11, and the filtering test was carried out in accordance with the method of Example 1 for each sample. In order to maintain pH of 11, 10% slurry of lime was gradually added after the addition of ferric chloride.

Table 11

| | Amounts to solid components | | | Addition of base (pH) | Filtering time (min.) |
|---|---|---|---|---|---|
| | light burned magnesia | lime | ferric chloride | | |
| Invention | 7 | | 7 | 11 | 2 |
| | 3 | | 3 | 11 | 4 |
| | 1 | | 1 | 11 | 9 |
| | 7 | | 7 | 8.5 | 6 |
| | 3 | | 3 | 8 | 15 |
| Reference | | 100 | 3 | 13 | 75 |
| | | 30 | 3 | 13 | 95 |
| | | 3 | 3 | 13 | >180 |
| | | 100 | | 13 | >180 |
| | | | 7 | 11 | 110 |

What is claimed is:

1. A treatment of a sludge containing biological aggregate or polyvalent metal hydroxide aggregate, which consists of adding light burned magnesia to said sludge, adjusting the pH of said sludge to the range of from 9 to 12 and filtering said sludge.

2. A treatment of a sludge according to claim 1, wherein said light burned magnesia is added together with an iron salt.

3. A treatment of a sludge according to claim 1, wherein said light burned magnesia is added at a ratio of 1 to 1,000 wt. % to solid components in the sludge.

4. A treatment of a sludge according to claim 1, wherein said light burned magnesia is added to a sludge containing biological aggregate which is formed by microorganism treatment.

5. A treatment of a sludge according to claim 1, wherein said light burned magnesia is added to a sludge resulted by adding an aluminum type coagulant or an iron type coagulant to a drainage.

6. A treatment of a sludge according to claim 1, wherein a base is added to give the pH of 9 to 12.

7. A treatment of a sludge according to claim 1, wherein light burned magnesia is added with another magnesium compound with or without a base so as to be pH of 9 to 12.

8. A treatment of a sludge according to claim 7, wherein said magnesium compound is selected from the group consisting of magnesium hydroxide, magnesium chloride, magnesium sulfate, magnesium carbonate and basic magnesium carbonate.

9. A treatment of a sludge according to claim 1, wherein an iron salt is added with light burned magnesia with or without a base so as to be pH of 9 to 12.

* * * * *